D. B. AKARD.
SHOCK ABSORBER.
APPLICATION FILED JAN. 31, 1910.

966,290.

Patented Aug. 2, 1910.

Witnesses.
Thos. Castberg
Charles Pickles

Inventor
Delvan B. Akard
by G. H. Strong
his Atty

UNITED STATES PATENT OFFICE.

DOLVAN B. AKARD, OF SAN FRANCISCO, CALIFORNIA.

SHOCK-ABSORBER.

966,290.          Specification of Letters Patent.       Patented Aug. 2, 1910.

Application filed January 31, 1910. Serial No. 540,999.

*To all whom it may concern:*

Be it known that I, DOLVAN B. AKARD, a citizen of the United States, residing in the city and county of San Francisco and State of California, have invented new and useful Improvements in Shock-Absorbers, of which the following is a specification.

My invention relates to a device for absorbing and relieving the shocks due to the rapid movement of heavy vehicles over irregular surfaces, and the consequent relief of the strain upon the springs of such vehicles.

It consists in the combination of parts, and in details of construction which will be more fully explained by reference to the accompanying drawings, in which—

Figure 1:
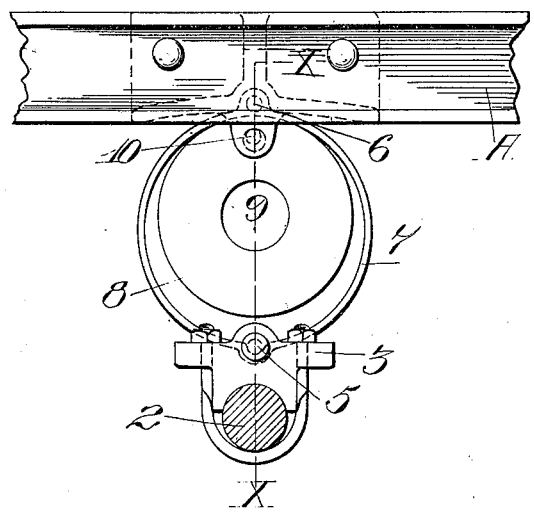
Figure 2:
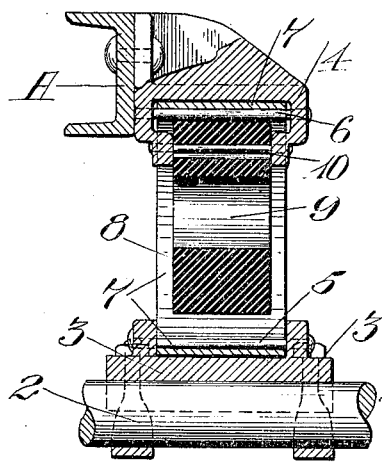

Figure 1 is a side elevation of my device. Fig. 2 is a section through $x$—$x$ of Fig. 1.

It is the object of my invention to provide an apparatus by which the excessive movement, and especially the rebound of a vehicle passing over rough surfaces may be reduced, and the strain upon the springs correspondingly relieved.

As shown in the drawing, A may indicate part of the frame of a vehicle, and 2 a wheel axle. This axle has fixed to it a yoke or bracket 3, and a bracket 4 is fixed to the frame of the machine in line above the one shown at 3. A pin 5 passes through the bracket 3, another pin 6 through the bracket 4, and a lever or equivalent flexible band or strap 7 passes around these pins indicated. Within this band or strap is the elastic cushion 8 which is here shown as made in the form of a thick cylindrical block of rubber having a central opening as shown at 9. Through the upper part of this block passes a pin 10 which secures it to the lower part of the bracket 4. This rubber block is thus held in position substantially above the vehicle axle 2.

The operation of the device will then be as follows: Any approach of the axle and the frame caused by the movement of the machine over irregularities will cause the rubber block 8 to be compressed in a vertical direction, with a corresponding tendency to elongate horizontally, and by reason of this block fitting within the flexible strap 7, the amount of compression and elongation of the block will be controlled by this strap. When the rebound of the machine takes place, and the frame tends to rise the corresponding elongation of the cushion in a vertical direction will take place; while it will become narrowed or shortened in a horizontal direction, being always contained within the strap 7, there will be a limitation of movement and a protection of the rubber against undue movement.

Having thus described my invention, what I claim and desire to secure by Letters Patent is—

1. The combination in a shock absorber, of a bracket secured to the frame of the machine, a second bracket secured to the axle, a cylindrical elastic cushion carried by the frame bracket, and having its lower periphery free and substantially in vertical line with the axle, a flexible strap inclosing the cushion, said cushion having the greater portion of its circumference normally out of contact with the strap, pins in the frame and axle bracket respectively, exteriorly to which the strap passes.

2. The combination in a shock absorber, of a cylindrical elastic cushion, a frame and means by which said cushion is supported therefrom, a wheel axle in line beneath the cushion support, pins extending above and below the cushion, and an endless flexible band inclosing the cushion and passing above and below said pins, said cushion having less diameter than that of the band whereby substantially the entire circumference of the cushion is normally out of contact with said band.

In testimony whereof I have hereunto set my hand in the presence of two subscribing witnesses.

DOLVAN B. AKARD.

Witnesses:
    CHARLES EDELMAN,
    A. P. LATHROP.